United States Patent
Nomura et al.

(10) Patent No.: US 10,119,024 B2
(45) Date of Patent: Nov. 6, 2018

(54) RESIN COMPOSITION AND MOLDED ARTICLE THEREOF

(71) Applicant: TORAY INDUSTRIES, INC., Tokyo (JP)

(72) Inventors: Keiichiro Nomura, Nagoya (JP);
Nobuhiro Morioka, Nagoya (JP);
Sadayuki Kobayashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/673,953

(22) Filed: Aug. 10, 2017

(65) Prior Publication Data

US 2017/0335104 A1   Nov. 23, 2017

Related U.S. Application Data

(63) Continuation of application No. PCT/JP2016/061798, filed on Apr. 12, 2016.

(30) Foreign Application Priority Data

Apr. 14, 2015 (JP) .................. 2015-082166
Jul. 31, 2015 (JP) .................. 2015-151958
Aug. 28, 2015 (JP) .................. 2015-169012

(51) Int. Cl.
*C08L 71/00*   (2006.01)
*C08L 77/00*   (2006.01)
*C08L 77/02*   (2006.01)
*C08G 83/00*   (2006.01)
*C08L 71/02*   (2006.01)

(52) U.S. Cl.
CPC .......... *C08L 77/02* (2013.01); *C08G 83/007* (2013.01); *C08L 71/02* (2013.01)

(58) Field of Classification Search
None
See application file for complete search history.

(56) References Cited

U.S. PATENT DOCUMENTS

2016/0340485 A1   11/2016   Nomura et al.

FOREIGN PATENT DOCUMENTS

| JP | 5-339462 A | 12/1993 |
|----|---|---|
| JP | 9-31325 A | 2/1997 |
| JP | 2000-186204 A | 7/2000 |
| JP | 2008-45055 A | 2/2008 |
| JP | 2013-209460 A | 10/2013 |
| JP | 2014-84414 A | 5/2014 |
| JP | 5804222 B1 | 11/2015 |
| WO | WO 2015/041322 A1 | 3/2015 |

OTHER PUBLICATIONS

JP 2014084414 machine translation.*
International Search Report for PCT/JP2016/061798 (PCT/ISA/210) dated Jul. 5, 2016.
Ito, Novel Cross-Linking Concept of Polymer Network: Synthesis, Structure, and Properties of Slide-Ring Gels with Freely Movable Junctions, Polymer Journal, May 9, 2007, vol. 39, No. 6, pp. 489-499.
Li et al., "Highly toughened polylactide with novel sliding graft copolymer by in situ reactive compatibilization, crosslinking and chain extension", Polymer, vol. 55, 2014, pp. 4313-4323.
Written Opinion of the International Searching Authority for PCT/JP2016/061798 (PCT/ISA/237) dated Jul. 5, 2016.

* cited by examiner

*Primary Examiner* — Ana L. Woodward
(74) *Attorney, Agent, or Firm* — Birch, Stewart, Kolasch & Birch, LLP

(57) ABSTRACT

Disclosed is a resin composition including at least a polyamide (A) and a polyrotaxane (B) whose cyclic molecule is modified with a graft chain, which are mixed together, wherein 80 parts by weight or more and 99.9 parts by weight or less of the polyamide (A) and 0.1 part by weight or more and 20 parts by weight or less of the polyrotaxane (B) are mixed together relative to 100 parts by weight of the total amount of the polyamide (A) and the polyrotaxane (B). To provide a resin composition capable of affording a molded article having excellent balance between rigidity and toughness.

6 Claims, No Drawings

RESIN COMPOSITION AND MOLDED ARTICLE THEREOF

CROSS REFERENCE TO RELATED APPLICATIONS

This application is a Continuation of PCT International Application No. PCT/JP2016/061798, filed on Apr. 12, 2016, which claims priority under 35 U.S.C. 119(a) to Patent Application Nos. 2015-082166, filed in Japan on Apr. 14, 2015, No. 2015-151958, filed in Japan on Jul. 31, 2015, and No. 2015-169012, filed in Japan on Aug. 28, 2015, all of which are hereby expressly incorporated by reference into the present application.

TECHNICAL FIELD

The present invention relates to a polyamide resin composition obtained by mixing a polyamide and a polyrotaxane whose cyclic molecule is modified, and a molded article obtained by molding the same.

BACKGROUND ART

Because of having properties suited for use as engineering plastics, for example, excellent mechanical properties such as rigidity and toughness as well as excellent thermal properties, a polyamide has widely been used in applications such as electric and electronic components, machine components, and automobile components, centering on injection molding applications. There has been known, as a method of further improving toughness of a polyamide resin, a method of mixing an olefin-based elastomer, or a core-shell compound obtained by coating a rubbery core layer with a shell layer of a glassy resin. There has been proposed, as technology of mixing the olefin-based elastomer, for example, a polyamide-based resin composition comprising a continuous phase composed of a polyamide resin, and a particle-like dispersion phase composed of a polyolefin modified with an α,β-unsaturated carboxylic acid dispersed in the continuous phase (see, for example, Patent Literature 1). There have been proposed, as technology of mixing the core-shell compound, for example, mixing an impact-resistant thermoplastic resin composition comprising a composite rubber-based graft copolymer and a thermoplastic resin, the composite rubber-based graft copolymer being obtained by graft polymerization of multi-layered structure polymer particles comprising a polyalkyl (meth)acrylate as a core, and a first layer composed of a polyorganosiloxane and a second layer composed of a polyalkyl (meth)acrylate formed on the core with a vinyl-based monomer (see, for example, Patent Literature 2); and mixing a polyamide resin composition comprising a polyamide resin including a dicarboxylic acid unit containing a terephthalic acid unit, a 1,9-nonanediamine unit and/or a diamine unit containing a 2-methyl-1,8-octanediamine unit, and resin fine particles having a core-shell structure (see, for example, Patent Literature 3). When these resin compositions are applied for various applications, particularly automobile structural materials, it becomes necessary to satisfy both toughness and rigidity. The resin compositions disclosed in Patent Literatures 1 to 3 had a problem that rigidity deteriorates, although mixing of the olefin-based elastomer or the core-shell compound leads to an improvement in impact resistance or toughness.

Meanwhile, there have been proposed, as a method of improving impact strength and toughness, for example, a resin composition obtained by reacting a polyolefin modified with an unsaturated carboxylic anhydride with a polyrotaxane having a functional group (see, for example, Patent Literature 4); and a polylactic acid-based resin composition comprising a polyrotaxane in which the opening part of a cyclic molecule having a graft chain composed of polylactic acid is included by a linear molecule (see, for example, Patent Literature 5).

CITATION LIST

Patent Literature

[Patent Literature 1]
  Japanese Unexamined Patent Publication (Kokai) No. 9-31325
[Patent Literature 2]
  Japanese Unexamined Patent Publication (Kokai) No. 5-339462
[Patent Literature 3]
  Japanese Unexamined Patent Publication (Kokai) No. 2000-186204
[Patent Literature 4]
  Japanese Unexamined Patent Publication (Kokai) No. 2013-209460
[Patent Literature 5]
  Japanese Unexamined Patent Publication (Kokai) No. 2014-84414

SUMMARY OF INVENTION

Technical Problem

However, the resin composition mentioned in Patent Literature 4 has a problem such as insufficient rigidity. The resin composition mentioned in Patent Literature 5 exhibited still insufficient toughness, although toughness of polylactic acid is improved.

As disclosed in Patent Literatures 4 to 5, it has been known that use of the polyrotaxane leads to an improvement in impact strength and toughness of the polyolefin and polylactic acid. However, because of poor compatibility and reactivity with the polyamide, it was difficult to apply the polyrotaxane disclosed in these patent literatures for property modification of the polyamide having excellent rigidity.

In the light of problems of the present invention, an object of the present invention is to provide a resin composition capable of affording a molded article having excellent balance between rigidity and toughness.

Solution to Problem

To solve the problems mentioned above, the present invention has the following structure.

A resin composition including at least a polyamide (A) and a polyrotaxane (B) whose cyclic molecule is modified with a graft chain, which are mixed together, wherein 80 parts by weight or more and 99.9 parts by weight or less of the polyamide (A) and 0.1 part by weight or more and 20 parts by weight or less of the polyrotaxane (B) are mixed together relative to 100 parts by weight of the total amount of the polyamide (A) and the polyrotaxane (B).

Advantageous Effects of Invention

According to the resin composition of the present invention, it is possible to afford a molded article having excellent balance between rigidity and toughness.

DESCRIPTION OF EMBODIMENTS

The present invention will be described in more detail below.

The resin composition of the present invention is obtained by mixing a polyamide (A) and a polyrotaxane (B) whose cyclic molecule is modified with a graft chain. Mixing of the polyamide (A) enables an improvement in rigidity and heat resistance of the resin composition. Mixing of the polyrotaxane (B) enables an improvement in toughness of the resin composition. Mixing of a polyrotaxane whose cyclic molecule is modified with a graft chain having a specific functional group at the end of the graft chain leads to a reaction of an amine end and/or a carboxyl end of the polyamide (A) with a functional group of a graft chain end of the polyrotaxane (B), thus making it possible to exert the toughness improving effect on the entire resin composition and to improve toughness while maintaining rigidity.

In the resin composition of the present invention, since a reaction product of the polyamide (A) and the polyrotaxane (B) is produced by a complicated reaction between polymers, it is not practical to specify a structure of each component included in the resin composition, so that the invention was specified by the amount of each raw material component to be mixed. Namely, the resin composition of the present invention is obtained by mixing 80 parts by weight or more and 99.9 parts by weight or less of the polyamide (A) and 0.1 part by weight or more and 20 parts by weight or less of the polyrotaxane (B) relative to the total amount of 100 parts by weight of the polyamide (A) and the polyrotaxane (B). If a mixing amount of the polyamide (A) is less than 80 parts by weight, rigidity and heat resistance of the thus obtained molded article deteriorate. The mixing amount of the polyamide (A) is preferably 90 parts by weight or more, and more preferably 93 parts by weight or more. Meanwhile, if the mixing amount of the polyamide (A) exceeds 99.9 parts by weight, the mixing amount of the polyrotaxane (B) relatively decreases, resulting in deterioration of toughness of the molded article. The mixing amount of the polyamide (A) is preferably 99.5 parts by weight or less.

The polyamide (A) include a residue of an amino acid, a lactam, or a diamine and a dicarboxylic acid as a main constituent component. Typical examples of the raw material include amino acids such as 6-aminocaproic acid, 11-aminoundecanoic acid, 12-aminododecanoic acid, and para-aminomethylbenzoic acid; lactams such as ε-caprolactam and ω-laurolactam; aliphatic diamines such as tetramethylenediamine, pentamethylenediamine, hexamethylenediamine, 2-methylpentamethylenediamine, nonamethylenediamine, decamethylenediamine, undecamethylenediamine, dodecamethylenediamine, 2,2,4-/2,4,4-trimethylhexamethylenediamine, and 5-methylnonamethylenediamine; aromatic diamines such as meta-xylylenediamine and para-xylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, sodium 5-sulfoisophthalate, 2,6-naphthalenedicarboxylic acid, hexahydroterephthalic acid, and hexahydroisophthalic acid; and alicyclic dicarboxylic acids such as 1,4-cylohexanedicarboxylic acid, 1,3-cyclohexanedicarboxylic acid, 1,2-cyclohexanedicarboxylic acid, and 1,3-cyclopentanedicarboxylic acid. Two or more polyamide homopolymers or copolymers derived from these raw materials may be mixed.

Specific examples of the polyamide (A) include polycaproamide (nylon 6), poly(hexamethylene adipamide) (nylon 66), poly(tetramethylene adipamide) (nylon 46), poly(tetramethylene sebacamide) (nylon 410), poly(pentamethylene adipamide) (nylon 56), poly(pentamethylene sebacamide) (nylon 510), poly(hexamethylene sebacamide) (nylon 610), poly(hexamethylene dodecanamide) (nylon 612), poly(decamethylene adipamide) (nylon 106), poly(decamethylene sebacamide) (nylon 1010), poly(decamethylene dodecanamide) (nylon 1012), polyundecaneamide (nylon 11), polydodecaneamide (nylon 12), polycaproamide/poly(hexamethylene adipamide) copolymer (nylon 6/66), polycaproamide/poly(hexamethylene terephthalamide) copolymer (nylon 6/6T), poly(hexamethylene adipamide)/poly(hexamethylene terephthalamide) copolymer (nylon 66/6T), poly(hexamethylene adipamide)/poly(hexamethylene isophthalamide) copolymer (nylon 66/6I), poly(hexamethylene terephthalamide)/poly(hexamethylene isophthalamide) copolymer (nylon 6T/6I), poly(hexamethylene terephthalamide)/polydodecaneamide copolymer (nylon 6T/12), poly(hexamethylene adipamide)/poly(hexamethylene terephthalamide)/poly(hexamethylene isophthalamide) copolymer (nylon 66/6T/6I), poly(xylylene adipamide) (nylon XD6), poly(xylylene sebacamide) (nylon XD10), poly(hexamethylene terephthalamide)/poly(pentamethylene terephthalamide) copolymer (nylon 6T/5T), poly(hexamethylene terephthalamide)/poly(2-methylpentamethylene terephthalamide) copolymer (nylon 6T/M5T), poly(pentamethylene terephthalamide)/poly(decamethylene terephthalamide) copolymer (nylon 5T/10T), poly(nonamethylene terephthalamide) (nylon 9T), poly(decamethylene terephthalamide) (nylon 10T), poly(dodecamethylene terephthalamide) (nylon 12T), and copolymers thereof. Two or more polyamides may be mixed. As used herein, the symbol "/" means a copolymer, and same shall apply hereinafter.

A melting point of the polyamide (A) is preferably 150° C. or higher and lower than 300° C. If the melting point is 150° C. or higher, it is possible to improve heat resistance. Meanwhile, if the melting point is lower than 300° C., it is possible to appropriately suppress a processing temperature during the production of the resin composition to thereby suppress thermal decomposition of the polyrotaxane (B).

The melting point of the polyamide in the present invention is defined as a temperature of an endothermic peak which appears when the temperature of the polyamide is decreased to 30° C. from a molten state in an inert gas atmosphere at a temperature decrease rate of 20° C./minute, and then increased to the melting point+40° C. at a temperature increase rate of 20° C./minute, using a differential scanning calorimeter. When two or more endothermic peaks are detected, a temperature of an endothermic peak having the largest peak intensity is regarded as the melting point.

Specific examples of the polyamide having a melting point of 150° C. or higher and lower than 300° C. include polycaproamide (nylon 6), poly(hexamethylene adipamide) (nylon 66), poly(pentamethylene adipamide) (nylon 56), poly(tetramethylene adipamide) (nylon 46), poly(hexamethylene sebacamide) (nylon 610), poly(hexamethylene dodecanamide) (nylon 612), polyundecaneamide (nylon 11), polydodecaneamide (nylon 12), polycaproamide/poly(hexamethylene adipamide) copolymer (nylon 6/66), polycaproamide/poly(hexamethylene terephthalamide) copolymer (nylon 6/6T), poly(hexamethylene adipamide)/poly(hexamethylene isophthalamide) copolymer (nylon 66/6I), poly(hexamethylene terephthalamide)/poly(hexamethylene isophthalamide) copolymer (nylon 6T/6I), poly(hexamethylene terephthalamide)/polydodecaneamide copolymer (nylon 6T/12), poly(hexamethylene adipamide)/poly(hexamethylene terephthalamide)/poly(hexamethylene isophthalamide) copolymer (nylon 66/6T/6I), poly(xylylene adipamide) (nylon XD6), poly(hexamethylene terephthalamide)/poly(2-methylpentamethylene terephthalamide) copolymer (nylon 6T/M5T), poly(nonamethylene terephthalamide) (nylon 9T), and copolymers thereof. Two or more polyamides may be mixed.

An amide group concentration of the polyamide (A) is preferably 8.10 mmol/g or more since reactivity with a functional group of a graft chain end of the polyrotaxane (B) is further improved, thus enabling further improvement in toughness. The amide group concentration is preferably 14.0 mmol/g or less. Here, the amide group concentration is represented by the equation (1) mentioned below after specifying a structural formula of a residue of an amino acid, a lactam, a diamine, or a dicarboxylic acid, which is a constituent component, using a common analytical method, followed by calculation of a molecular weight thereof. Amide group concentration (mol/g)=(number of amide groups of structural unit/molecular weight of structural unit) (1). In the equation (1) mentioned above, the molecular weight of the structural unit means a molecular weight of a repeating structural unit constituting the polyamide. In the case of a polyamide including an amino acid as the constituent component, the molecular weight of the structural unit is equal to a value obtained by subtracting the molecular weight of one water molecule from the molecular weight of the amino acid. In the case of a polyamide including a lactam as the constituent component, the molecular weight of the structural unit is equal to the molecular weight of the lactam. In the case of a polyamide including a diamine and a dicarboxylic acid as the constituent components, the molecular weight of the structural unit is equal to a value obtained by subtracting the molecular weight of two water molecules from the sum of the molecular weight of the dicarboxylic acid and the molecular weight of the diamine.

Examples of means for adjusting the amide group concentration within the range mentioned above include a method in which a raw material having desired carbon atoms is selected from among those exemplified previously as the raw material of the polyamide.

There is no particular limitation on the polymerization degree of the polyamide (A), and a relative viscosity measured in a 98% concentrated sulfuric acid solution having a resin concentration of 0.01 g/ml at 25° C. is preferably within a range of 1.5 to 5.0. If the relative viscosity is 1.5 or more, it is possible to further improve toughness, rigidity, abrasion resistance, fatigue resistance, and creep resistance of the thus obtained molded article. The relative viscosity is more preferably 2.0 or more. Meanwhile, if the relative viscosity is 5.0 or less, the thus obtained resin composition is excellent in fluidity and molding processability.

The resin composition of the present invention is obtained by mixing a polyrotaxane (B) whose cyclic molecule is modified with a graft chain. A rotaxane commonly means a molecule having a shape in which a dumbbell-shaped axial molecule (linear molecule having a bulky blocking group at both ends, hereinafter referred to as a "linear molecule") passes through a cyclic molecule as mentioned, for example, in Harada, A., Li, J. & Kamachi, M., Nature 356, 325-327. When plural cyclic molecules are passed through by one linear molecule, it is referred to as a polyrotaxane.

The polyrotaxane is composed of a linear molecule and plural cyclic molecules and has a structure in which the linear molecule passes through the opening part of plural cyclic molecules, and also has a bulky blocking group at both ends of the linear molecule so as not to allow eliminating the linear molecule from the cyclic molecule. In the polyrotaxane, the cyclic molecule has a structure which enables free movement on the linear molecule, but does not enable the elimination from the linear molecule due to the blocking group. Namely, the linear molecule and the cyclic molecule have a structure capable of maintaining a form by a mechanical bond, not a chemical bond. Such a polyrotaxane has the effect of reducing stress from the exterior and stress remaining inside since the cyclic molecule has high mobility. Furthermore, mixing of a polyrotaxane whose cyclic molecule is modified in a graft chain having a specific functional group at the end of the graft chain enables exertion of the similar effect on the polyamide.

The linear molecule is not particularly limited as long as it is a molecule which passes through the opening part of the cyclic molecule, and also has a functional group capable of reacting with the blocking group. Examples of the linear molecule, which is preferably used, include polyalkylene glycols such as polyethylene glycol, polypropylene glycol, and polytetramethylene glycol; hydroxyl group-terminated polyolefins such as polybutadiene diol, polyisoprene diol, polyisobutylene diol, poly(acrylonitrile-butadiene) diol, hydrogenated polybutadiene diol, polyethylene diol, and polypropylene diol; polyesters such as polycaprolactone diol, polylactic acid, polyethylene adipate, polybutylene adipate, polyethylene terephthalate, and polybutylene terephthalate; terminal functional polysiloxanes such as silanol-terminated polydimethylsiloxane; amino group-terminated chain polymers such as amino group-terminated polyethylene glycol, amino group-terminated polypropylene glycol, and amino group-terminated polybutadiene; and tri- or higher polyfunctional chain polymers having three or more functional groups mentioned above in one molecule. Of these linear molecules, polyethylene glycol and/or amino group-terminated polyethylene glycol is/are preferably used in view of the fact that it is easy to synthesize the polyrotaxane.

A number average molecular weight of the linear molecule is preferably 2,000 or more, thus making it possible to further improve rigidity. The number average molecular weight is more preferably 10,000 or more. Meanwhile, the number average molecular weight of the linear molecule is preferably 100,000 or less since it is possible to improve compatibility with the polyamide (A) and to refine a phase-separated structure, thus enabling further improvement in toughness. The number average molecular weight is more preferably 50,000 or less. Here, the number average molecular weight of the linear molecule means a value in terms of poly(methyl methacrylate), measured by gel permeation chromatography in which hexafluoroisopropanol is used as a solvent and Shodex HFTP-806M (two columns)+HFIP-LG are used as columns.

The blocking group is capable of linking to a terminal functional group of the linear molecule, and is not particularly limited as long as it is a sufficiently bulky group so as not to allow eliminating the cyclic molecule from the linear molecule. Examples of the blocking group, which is preferably used, include a dinitrophenyl group, a cyclodextrin group, an adamantyl group, a trityl group, a fluoresceinyl group, a pyrenyl group, an anthracenyl group, a polymer having a number average molecular weight of 1,000 to 1,000,000, and the like. Of these, two or more blocking groups may be used.

The cyclic molecule is not particularly limited as long as the linear molecule can pass through the opening part thereof. Examples of the cyclic molecule, which is preferably used, include cyclodextrins, crown ethers, cryptands, large cyclic amines, calixarenes, cyclophanes, and the like. Cyclodextrins are cyclic compounds of plural glucoses linked through an α-1,4-bond. A compound selected from α-cyclodextrin, β-cyclodextrin, and γ-cyclodextrin is more preferably used.

The polyrotaxane (B) in the present invention is characterized in that the cyclic molecule is modified with a graft chain. It is preferred that the graft chain has at least one functional group selected from the group consisting of a carboxyl group, an isocyanate group, a glycidyl group, and an amino group at the end of the graft chain. The carboxyl group and the glycidyl group have high reactivity with an amine end of the polyamide (A), while the isocyanate group and the amino group have high reactivity with a carboxyl end of the polyamide (A). Therefore, modification of the cyclic molecule with the above-mentioned graft chain having a specific functional group makes compatibility of the polyrotaxane (B) with the polyamide (A), solubility in an organic solvent, and reactivity satisfactory. As a result, it is possible to improve toughness while maintaining rigidity of the polyamide (A), thus enabling an improvement in rigidity and toughness with a good balance.

It is preferred that the graft chain is composed of a polyester. In view of compatibility with the polyamide (A) and solubility in the organic solvent, the graft chain is more preferably an aliphatic polyester. Examples of the aliphatic polyester include polylactic acid, polyglycolic acid, poly(3-hydroxybutyrate), poly(4-hydroxybutyrate), poly(3-hydroxybutyrate/3-hydroxyvalerate), poly(ε-caprolactone), and the like. Of these, poly(ε-caprolactone) is more preferable from the viewpoint of compatibility with the polyamide (A).

The polyrotaxane (B) modified with a graft chain having the above-mentioned various functional groups can be obtained by the following method. For example, when the graft chain is composed of a polyester, the end of the graft chain becomes a hydroxyl group. It is possible to obtain a polyrotaxane in which the end of the graft chain is modified with a carboxyl group by reacting the hydroxyl group with succinic anhydride. It is also possible to obtain a polyrotaxane whose end is modified with an amine group by reacting the carboxyl group with a diamine.

It is also possible to obtain a polyrotaxane modified with an isocyanate group by reacting the hydroxyl group with one end of a diisocyanate.

It is possible to obtain a polyrotaxane in which the end of a graft chain is modified with a glycidyl group by reacting the hydroxyl group with (meth)acryloyloxyethyl isocyanate and then oxidizing an acrylic group with an oxidizing agent.

It is preferred that the resin composition contains 3 parts by weight or more and 25 parts by weight or less of a reaction product of the polyamide (A) and the polyrotaxane (B) relative to 100 parts by weight of the total amount of the polyamide (A) and the polyrotaxane (B). Inclusion of 3 parts by weight or more of the reaction product of the polyamide (A) and the polyrotaxane (B) enables exertion of the toughness improving effect possessed by the polyrotaxane on the entire resin composition. The content of the reaction product is more preferably 5 parts by weight or more. Meanwhile, inclusion of 25 parts by weight or less of the reaction product enables suppression of production of an excessively crosslinked reaction product. The excessively crosslinked reaction product is likely to be a starting point of crack during fracture, and can exert an adverse influence on mechanical properties of the resin composition. The content of the reaction product is more preferably 20 parts by weight or less.

Here, the reaction product of the polyamide (A) and the polyrotaxane (B) was produced by a complicated reaction between polymers, thus failing to specify the structure thereof. However, the content of the reaction product in the composition can be determined by the following method.

It is possible to extract only the unreacted polyrotaxane component from the resin composition by crushing the resin composition and subjecting the crushed material to Soxhlet extraction using acetone as a solvent. Specifically, the resin composition is crushed into pieces having a particle diameter of 100 μm or less using a crusher. Furthermore, Soxhlet extraction is performed for 24 hours using acetone as a solvent, and then the unreacted polyrotaxane component is extracted from the crushed material. A content ratio (X) of the unreacted polyrotaxane in the resin composition can be determined by quantitative determination of the unreacted polyrotaxane component contained in an extracting solution. It is also possible to calculate a ratio (Y:Z) of a content ratio (Y) of the unreacted polyamide contained in the extraction residue and a content ratio (Z) of a reaction product of the polyamide (A) and the polyrotaxane (B) by dissolving the extraction residue obtained after extraction in hexafluoroisopropanol, and measuring by gel permeation chromatography. Specifically, a solution of the extraction residue is measured by gel permeation chromatography in which hexafluoroisopropanol is used as a solvent and Shodex HFIP-806M (two columns)+HFIP-LG are used as columns. From a peak area ratio of the thus obtained chart, calculation is made on a ratio (Y:Z) of a content ratio (Y) of the unreacted polyamide and a content ratio (Z) of a reaction product of the polyamide (A) and the polyrotaxane (B). From the thus obtained value, a content ratio of a reaction product of the polyamide (A) and the polyrotaxane (B) in the resin composition can be obtained by the following equation (2).

$$\text{Content ratio of reaction product (parts by weight)} = 100 \times (1-X) \times Z/(Y+Z) \quad (2)$$

A concentration of functional group at the end of the graft chain of the polyrotaxane (B) is preferably $2 \times 10^{-5}$ mol/g or more and $5 \times 10^{-4}$ mol/g or less. The adjustment of the concentration of functional group to $2 \times 10^{-5}$ mol/g or more enables an improvement in reactivity with the end of the polyamide (A). As a result, toughness can be further improved while maintaining rigidity of the polyamide (A), thus enabling an improvement in rigidity and toughness with a good balance. The concentration of functional group is more preferably $3 \times 10^{-5}$ mol/g or more. Meanwhile, the adjustment of the concentration of functional group to $5 \times 10^{-4}$ mol/g or less enables suppression of aggregation due to association between functional groups of the polyrotaxane (B) and excessive chemical crosslinking with the polyamide (A), and suppression of the generation of aggregates and gel, thus enabling further improvement in toughness. The concentration of functional group is more preferably $1 \times 10^{-4}$ mol/g or less.

Here, a concentration of functional group at the end of the graft chain of the polyrotaxane (B) can be determined by titration. For example, the carboxyl group concentration can be determined by the following method. Using a vacuum dryer at 80° C., an absolutely dried sample is produced by drying the polyrotaxane (B) for 10 hours or more. With respect to a solution obtained by dissolving 0.2 g of the absolutely dried sample in 25 ml of benzyl alcohol, a carboxyl group concentration can be determined by titration using an ethanol solution of potassium hydroxide having a concentration of 0.02 mol/L. With respect to other functional groups, the concentration of functional group can be calculated by a known method.

By reacting a polyrotaxane whose cyclic molecule is modified with a graft chain with an introductory compound which has a desired functional group and is also capable of reacting with a graft chain end, the functional group of the graft chain end can be imparted. In this case, it is possible to adjust the concentration of functional group at the end of the graft chain within a desired range by adjusting a charge ratio of the polyrotaxane whose cyclic molecule is modified with a graft chain and the introductory compound.

The weight average molecular weight of the polyrotaxane (B) is preferably 100,000 or more since rigidity and toughness can be further improved. Meanwhile, the weight average molecular weight is preferably 1,000,000 or less since compatibility with the polyamide (A) is improved, thus enabling further improvement in toughness. Here, the weight average molecular weight of the linear molecule means a value in terms of poly(methyl methacrylate), measured by gel permeation chromatography in which hexafluoroisopropanol is used as a solvent and Shodex HFIP-806M (two columns)+HFIP-LG are used as columns.

A mixing amount of the polyrotaxane (B) is 0.1 part by weight or more and 20 parts by weight or less relative to 100 parts by weight of the total amount of the polyamide (A) and the polyrotaxane (B). If the mixing amount of the polyrotaxane (B) is 0.1 part by weight, the stress reducing effect of the polyrotaxane (B) is not sufficiently exerted, resulting in deterioration of toughness of the molded article. The mixing amount of polyrotaxane (B) is preferably 0.5 part by weight or more. Meanwhile, if the mixing amount of the polyrotaxane (B) exceeds 20 parts by weight, the mixing amount of the polyamide (A) relatively decreases, resulting in deterioration of rigidity and heat resistance of the thus obtained molded article. The mixing amount is preferably 10 parts by weight or less, and more preferably 7 parts by weight or less.

The resin composition preferably has a so-called lakes-in-islands-in-sea structure in which a sea phase including the polyamide (A) as a main component and an island phase including the polyrotaxane (B) as a main component exist to form an islands-in-sea structure, and a lake phase including the polyamide (A) and/or a reaction product of the polyamide (A) and the polyrotaxane (B) as main component(s) also exists in the island phase. Here, "main component" means a component which accounts for 80% by weight or more of each phase. It has been known that properties of the resin composition are also influenced by a phase-separated structure or a phase size thereof. The resin composition, which is composed of two or more components and has the phase-separated structure, exhibits excellent properties as compared with the case where each component exists alone by making up for the disadvantage each component while utilizing its advantage. When the resin composition has such a lakes-in-islands-in-sea structure, crack progress during fracture is suppressed, thus enabling further improvement in toughness. Namely, although crack formed due to stress concentration propagates in the sea phase including the polyamide (A) as a main component, the existence of the island phase including the polyrotaxane (B) as a main component guides the crack to the comparatively flexible island phase, where stress is dispersed, leading to suppression of propagation of the crack. When the lake phase exists in the island phase, the effect of suppressing crack propagation becomes more likely to be exerted. It is considered that such a lakes-in-islands-in-sea structure is often formed as a result of a reaction between the polyamide (A) and the polyrotaxane (B) at the phase interface. Namely, it is considered that a reaction product of the polyamide (A) and the polyrotaxane (B) formed at the interface between two phases as a result of the reaction, and the polyamide (A) therearound are allowed to easily enter into a polyrotaxane phase (island phase), thus leading to formation of a lake phase.

In the lakes-in-islands-in-sea structure, an average diameter of the island phase is preferably 0.01 µm or more, and more preferably 0.05 µm or more. If the average diameter of the island phase is 0.01 µm or more, properties derived from the phase-separated structure is more effectively exhibited, thus enabling further improvement in toughness. The average diameter of the island phase is preferably 10 µm or less, more preferably 1 µm or less, and still more preferably 0.5 µm or less. If the average diameter of the island phase is 10 µm or less, the effect of suppressing crack progress during fracture is more effectively exerted, thus enabling further improvement in toughness. It is possible to further improve rigidity by decreasing the size of the phase of the flexible polyrotaxane. The average diameter of the lake phase is not particularly limited, and is preferably 0.005 µm or more, and preferably ½ or less of the average diameter of the island phase.

It is possible to determine the average diameter of the island phase and that of the lake phase of the islands-in-sea structure or the lakes-in-islands-in-sea structure in the resin composition by electron microscopic observation using the following method. Under common molding conditions, the phase-separated structure and the size of each phase of the resin composition do not change, so that the phase-separated structure is observed using a test piece obtained by molding the resin composition in the present invention. First, the center of a cross-section of a JIS #1 strip-shaped test piece (80 mm in length×10 mm in width×4 mm in thickness) obtained by injection molding is cut into pieces of 1 to 2 square mm, followed by staining the polyamide (A) with phosphotungstic acid/osmium and further cutting at −196° C. using an ultramicrotome to obtain an ultra-thin section having a thickness of 0.1 µm or less (about 80 nm), which is used as a sample for transmission electron microscope. When an average diameter of an island phase of an islands-in-sea structure or a lakes-in-islands-in-sea structure, a magnification is adjusted with respect to the above-mentioned sample for transmission electron microscope so that 50 or more and less than 100 island phases exist in a square electromicroscopic photograph. At such a magnification, 50 island phases are selected at random from the island phases existing in observed images, and then a major axis and a minor axis are measured with respect to each island phase. An average of the major axis and the minor axis is regarded as a diameter of each island phase, and an average of the thus measured diameters of all island phases is regarded as an average diameter of the island phase. The major axis and the minor axis of the island phase respectively mean the longest diameter and the shortest diameter of the island phase. It is also possible to measure an average diameter of a lake phase in the same manner as in the island phase.

It is possible to obtain the lakes-in-islands-in-sea structure in which the average diameter of the island phase and that of the lake phase are within the above-mentioned preferable range, for example, by adjusting the mixing amount of the polyamide (A) and that of the polyrotaxane (B) within the above-mentioned preferable range. The smaller the mixing amount of the polyrotaxane (B), the smaller the average diameter of the island phase and that of the lake phase tend to be. The larger the mixing amount of the polyrotaxane (B), the larger the average diameter of the island phase and that of the lake phase tend to be.

It is possible to further mix the resin composition with fillers, thermoplastic resins other than polyamide, various additives, and the like as long as the object of the present invention is not impaired.

Mixing of the filler enables further improvement in strength and rigidity of the thus obtained molded article. The filler may be either an organic filler or an inorganic filler, or may be either a fibrous filler or a non-fibrous filler. Of these, two or more fillers may be mixed.

Examples of the fibrous filler include a glass fiber, a carbon fiber, and the like. These fibers may be coated or bundled with a thermoplastic resin such as ethylene/vinyl acetate or a thermosetting resin such as epoxy resin. Examples of the cross section of the fibrous filler include circular shape, flat gourd-shape, cocoon-shape, oval shape, elliptical shape, rectangular shape, and the like.

Examples of the non-fibrous filler include: non-swellable silicates such as talc, wollastonite, zeolite, sericite, mica, kaolin, clay, pyrophyllite, bentonite, asbestos, alumina silicate, and calcium silicate; swellable lamellar silicates including swellable micas such as Li-type fluorine taeniolite, Na-type fluorine taeniolite, Na-type fluorine tetrasilicon mica, and Li-type fluorine tetrasilicon mica; metal oxides such as silicon oxide, magnesium oxide, alumina, silica, diatomite, zirconium oxide, titanium oxide, iron oxide, zinc oxide, calcium oxide, tin oxide, and antimony oxide; metal carbonates such as calcium carbonate, magnesium carbonate, zinc carbonate, barium carbonate, dolomite, and hydrotalcite; metal sulfates such as calcium sulfate and barium sulfate; metal hydroxides such as magnesium hydroxide, calcium hydroxide, aluminum hydroxide, and basic magnesium carbonate; smectite clay minerals such as montmorillonite, beidellite, nontronite, saponite, hectorite, and sauconite; various clay minerals such as vermiculite, halloysite, kanemite, kenyaite, zirconium phosphate, and titanium phosphate; glass beads, glass flakes, ceramic beads, boron nitride, aluminum nitride, silicon carbide, calcium phosphate, carbon black, and graphite. The above swellable lamellar silicate may have the exchangeable cation located between layers exchanged with organic onium ion. Examples of the organic onium ion include ammonium ion, phosphonium ion, or sulfonium ion.

Examples of the thermoplastic resin other than the polyamide include a polyester resin, a polyolefin resin, a modified polyphenylene ether resin, a polysulfone resin, a polyketone resin, a polyether imide resin, a polyarylate resin, a polyether sulfone resin, a polyether ketone resin, a polythioether ketone resin, a polyether ether ketone resin, a polyimide resin, a polyamide imide resin, and a polytetrafluoroethylene resin. Of these, two or more resins may be mixed.

Example of various additives include: heat stabilizers other than the copper compounds; coupling agents such as isocyanate-based compounds, organic silane-based compounds, organic titanate-based compounds, organic borane-based compounds, and epoxy compounds; plasticizers such as polyalkylene oxide oligomer compounds, thioether-based compounds, ester-based compounds, and organic phosphorous-based compounds; crystal nucleating agents such as organic phosphorous compounds and polyether ether ketones; metal soaps such as montanic acid waxes, lithium stearate, and aluminum stearate; mold release agents such as ethylenediamine-stearic acid-sebacic acid polycondensates, and silicone compounds; coloring-preventing agents such as hypophosphites; lubricants, ultraviolet protective agents, coloring agents; flame retardants; and foaming agents. When mixing these additives, the mixing amount is preferably 10 parts by weight or less, and more preferably 1 part by weight or less, relative to 100 parts by weight of the polyamide (A) so as to sufficiently make use of the feature of the polyamide.

Examples of the heat stabilizer other than the copper compound include phenol-based compounds such as N,N'-hexamethylenebis(3,5-di-t-butyl-4-hydroxy-hydrocinnamide) and tetrakis[methylene-3-(3',5'-di-t-butyl-4'-hydroxyphenyl)propionate]methane; phosphorus-based compounds; sulfur-based compounds such as mercaptobenzimidazole-based compounds, dithiocarbamic acid-based compounds, and organic thio acid-based compounds; and amine-based compounds such as N,N'-di-2-naphthyl-p-phenylenediamine and 4,4'-bis($\alpha,\alpha$-dimethylbenzyl)diphenylamine. Of these, two or more heat stabilizers may be mixed.

Examples of the method for producing a resin composition of the present invention include, but are not limited to, a method of kneading in a molten state, a method of mixing in a solution state, and the like. In view of an improvement in reactivity, the method of kneading in a molten state is preferable. Examples of the melt kneader for kneading in a molten state include a single-screw extruder, a multiple-screw extruder such as a twin-screw extruder or a quad-screw extruder, an extruder such as a twin-screw/single-screw composite extruder, a kneader, and the like. In view of productivity, an extruder capable of continuously producing is preferable. In view of improvement in kneadability, reactivity, and productivity, a twin-screw extruder is more preferable.

Taking the case of producing a resin composition using a twin-screw extruder as an example, a description will be made. From the viewpoint of suppressing thermal deterioration of the polyrotaxane (B) to thereby further improve toughness, a maximum resin temperature during melt kneading is preferably 300° C. or lower. Meanwhile, the maximum resin temperature is preferably a melting point of the polyamide (A) or higher. Here, the maximum resin temperature means the highest temperature of temperatures measured by resin thermometers arranged at equal interval in plural positions of the extruder.

An extrusion amount of the resin composition is preferably 0.01 kg/h or more, and more preferably 0.05 kg/h or more, per 1 rpm of screw rotation from the viewpoint of suppressing thermal deterioration of the polyamide (A) and the polyrotaxane (B). Meanwhile, the extrusion amount is preferably 1 kg/h or less per 1 rpm of screw rotation from the viewpoint of further promoting a reaction between the polyamide (A) and the polyrotaxane (B) resin to thereby form the above-mentioned lakes-in-islands-in-sea structure in an easier manner. Here, the extrusion amount means the weight (kg) of the resin composition to be ejected from the extruder per 1 hour.

In this way, the resin composition can be molded by a known method, thus making it possible to obtain various molded articles such as sheets and films. Examples of the molding method include an injection molding method, an injection compression molding method, an extrusion molding method, a compression molding method, a blow molding method, a press molding method, and the like.

The resin composition of the present invention and molded articles thereof can be used in various applications such as automobile components, electric and electronic components, construction components, various containers, commodities, household articles, and sanitary articles, by making use of excellent properties. The resin composition of the present invention and molded articles thereof are particularly preferably used in applications which need to have toughness and rigidity, such as automobile exterior components, automobile electrical components, automobile underhood components, automobile gear components, and electric and electronic components such as housing, connector, and reflector. Specifically, suitable applications thereof include automobile engine peripheral components such as engine cover, air intake pipe, timing belt cover, intake manifold, filler cap, throttle body, and cooling fan; automobile underhood components such as cooling fan, top and base of radiator tank, cylinder head cover, oil pan, brake piping, tube for fuel piping, and exhaust gas system components; automobile gear components such as gear, actuator, bearing retainer, bearing cage, chain guide, and chain tensioner; automobile interior components such as shift lever bracket, steering lock bracket, key cylinder, door inner handle, door handle cowl, rear-view mirror bracket, air conditioner switch, instrument panel, console box, glove compartment, steering wheel, and trim; automobile exterior components such as front fender, rear fender, fuel lid, door panel, cylinder head cover, door mirror stay, tail gate panel, license garnish, roof rail, engine mount bracket, rear garnish, rear spoiler, trunk lid, rocker molding, molding, lamp housing, front grill, mud guard, and side bumper; air intake and exhaust system components such as air intake manifold, intercooler inlet, exhaust pipe cover, inner bush, bearing retainer, engine mount, engine head cover, resonator, and throttle body; engine cooling water system components such as chain cover, thermostat housing, outlet pipe, radiator tank, alternator, and delivery pipe; automobile electric components such as connector, wire harness connector, motor component, lamp socket, in-vehicle sensor switch, and combination switch; and electric and electronic components such as SMT connector, socket, card connector, jack, power supply component, switch, sensor, capacitor seat plate, relay, resistor, fuse holder, coil bobbin, IC or LED housing, and reflector.

EXAMPLES

The present invention will be described by way of Examples, but the present invention is not limited to these Examples. To obtain a resin composition of each Example, the following raw materials were used.

<Polyamide>
(A-1): Nylon 6 resin ("AMILAN"®, $\eta_r$=2.70, melting point of 225° C., amide group concentration of 10.5 mmol/g, manufactured by Toray Industries, Ltd.)
(A-2): Nylon 6 resin (produced by the method of Reference Example 1), $\eta_r$=2.32, melting point of 225° C., amide group concentration of 10.5 mmol/g.

Here, the above relative viscosity $\eta_r$ was measured at 25° C. in a 98% concentrated sulfuric acid solution having the concentration of 0.01 g/ml. The melting point was determined by the following procedure using a differential scanning calorimeter. In an inert gas atmosphere, the temperature of a polyamide was decreased to 30° C. from a molten state at a temperature decrease rate of 20° C./minute and the temperature was increased to the melting point+40° C. at a temperature rise rate of 20° C./minute, and then the temperature of an endothermic peak observed was regarded as the melting point. When two or more endothermic peaks were observed, the temperature of the endothermic peak having the largest peak intensity was regarded as the melting point. The amide group concentration was calculated from a structural formula of a structural unit using the following equation (1).

Amide group concentration (mol/g)=(number of amide groups of structural unit/molecular weight of structural unit) (1)

<Polyrotaxane>
(B-1): produced by modifying a graft chain end of polyrotaxane ("SeRM"™ Super Polymer SH3400P, manufactured by Advanced Softmaterials Inc.) with succinic anhydride using the method mentioned in Reference Example 2. A number average molecular weight of polyethylene glycol as a linear molecule is 35,000, and an entire weight average molecular weight is 700,000.
(B-2): produced by modifying a graft chain end of polyrotaxane ("SeRM"™ Super Polymer SH2400P, manufactured by Advanced Softmaterials Inc.) with succinic anhydride using the method mentioned in Reference Example 3. A number average molecular weight of polyethylene glycol as a linear molecule is 20,000, and an entire weight average molecular weight is 400,000.
(B-3): produced by modifying a graft chain end of polyrotaxane ("SeRM"™ Super Polymer SH1310P, manufactured by Advanced Softmaterials Inc.) with succinic anhydride using the method mentioned in Reference Example 4. A number average molecular weight of polyethylene glycol as a linear molecule is 11,000, and an entire weight average molecular weight is 180,000.
(B-4): produced by modifying a graft chain end of polyrotaxane ("SeRM"™ Super Polymer SH2400P, manufactured by Advanced Softmaterials Inc.) with succinic anhydride using the method mentioned in Reference Example 5. A number average molecular weight of polyethylene glycol as a linear molecule is 20,000, and an entire weight average molecular weight is 400,000.
(B-5): produced by modifying a graft chain end of polyrotaxane ("SeRM"™ Super Polymer SH2400P, manufactured by Advanced Softmaterials Inc.) with succinic anhydride using the method mentioned in Reference Example 6. A number average molecular weight of polyethylene glycol as a linear molecule is 20,000, and an entire weight average molecular weight is 400,000.
(B-6) produced by modifying a graft chain end of polyrotaxane ("SeRM"™ Super Polymer SH2400P, manufactured by Advanced Softmaterials Inc.) with succinic anhydride using the method mentioned in Reference Example 7. A number average molecular weight of polyethylene glycol as a linear molecule is 20,000, and an entire weight average molecular weight is 400,000.
(B-7): Polyrotaxane ("SeRM"™ Super Polymer SH3400P, manufactured by Advanced Softmaterials Inc.). A number average molecular weight of polyethylene glycol as a linear molecule is 35,000, and an entire weight average molecular weight is 700,000.
Any of "SeRM™" Super Polymers used as the raw material in (B-1) to (B-7) are polyrotaxanes in which a cyclic molecule is α-cyclodextrin modified with a graft chain composed of poly(ε-caprolactone), a linear molecule is polyethylene glycol, and a blocking group is an adamantane group.
(B-8): Using the method mentioned in the Reference Example 8, a polyrotaxane was produced.
Here, the weight average molecular weight of the polyrotaxane means a value in terms of poly(methyl methacrylate), measured by gel permeation chromatography in which hexafluoroisopropanol is used as a solvent and Shodex HFIP-806M (two columns)+HFIP-LG are used as columns.

<Other Components>
(C-1): Polyethylene glycol (PEG) (Polyethylene Glycol 20,000, manufactured by Wako Pure Chemical Industries, Ltd.).
(C-2): Glycidyl methacrylate-modified polyethylene copolymer (EGMA) ("BONDFAST"™ BF-7L, manufactured by Sumitomo Chemical Co., Ltd.).
(D-1): Maleic anhydride-modified polypropylene ("Fusabond"™ P613, manufactured by DuPont).
(D-2): Polylactic acid ("Ingeo"™ 4032D, manufactured by NatureWorks LLC).

Reference Example 1

A preheater was charged with 700 g of ε-caprolactam and 18.2 g (0.80 mol % relative to ε-caprolactam) of an aqueous 30% by weight hexamethylenediamine solution, sealed, and nitrogen-substituted, followed by preheating at 120° C. The thus preheated raw materials were supplied to the polymerization tank and then heated at 285° C. After the tank inner pressure reached 0.6 MPa, the tank inner pressure was kept at 0.6 MPa for 1.5 hours while removing moisture out of the system. Thereafter, the tank inner pressure was returned to ordinary pressure over 30 minutes and, followed by heating at a decompression degree of 60 kPa and a heater temperature of 285° C. for 2 hours. The polymer was ejected in the form of a gut from the polymerization tank, and then pelletized. The thus obtained pellets were subjected to hot water extraction and vacuum drying at 80° C. for 24 hours, and then solid-phase polymerization was performed under 50 Pa at 200° C. to obtain nylon 6 having $\eta_r$=2.32 and a melting point of 225° C.

Reference Example 2

"SeRM" Super Polymer SH3400P (50 g) was dissolved in 500 ml of a toluene solution and 1.3 g of succinic anhydride was added, followed by heating under nitrogen flow at 90° C. for 6 hours. After concentration using an evaporator until a polymer concentration became about 50%, the polymer solution was added to a large excess of a methanol solution and the precipitate was recovered. The thus obtained precipitate was dried in a vacuum dryer at 80° C. for 8 hours to obtain a polymer. The thus obtained polymer was dissolved in benzyl alcohol, followed by titration with a potassium hydroxide solution having a known concentration. As a result, it has been found that a carboxyl group concentration of a graft chain end is 2.53×10$^{-4}$ mol/g.

Reference Example 3

In the same manner as in Reference Example 2, except that "SeRM" Super Polymer SH2400P was used in place of "SeRM" Super Polymer SH3400P, a polymer was obtained. The thus obtained polymer was dissolved in benzyl alcohol, followed by titration with a potassium hydroxide solution having a known concentration. As a result, it has been found that a carboxyl group concentration of a graft chain end is 2.46×10$^{-4}$ mol/g.

Reference Example 4

In the same manner as in Reference Example 2, except that "SeRM" Super Polymer SH1310P was used in place of "SeRM" Super Polymer SH3400P, a polymer was obtained. The thus obtained polymer was dissolved in benzyl alcohol, followed by titration with a potassium hydroxide solution having a known concentration. As a result, it has been found that a carboxyl group concentration of a graft chain end is 2.51×10$^{-4}$ mol/g.

Reference Example 5

"SeRM"™ Super Polymer SH2400P (50 g) was dissolved in 500 ml of a toluene solution and 0.35 g of succinic anhydride was added, followed by heating under nitrogen flow at 90° C. for 6 hours. After concentration using an evaporator until a polymer concentration became about 50%, the polymer solution was added to a large excess of a methanol solution and the precipitate was recovered. The thus obtained precipitate was dried in a vacuum dryer at 80° C. for 8 hours to obtain a polymer. The thus obtained polymer was dissolved in benzyl alcohol, followed by titration with a potassium hydroxide solution having a known concentration. As a result, it has been found that a carboxyl group concentration of a graft chain end is 5.05×10$^{-5}$ mol/g.

Reference Example 6

"SeRM"™ Super Polymer SH2400P (50 g) was dissolved in 500 ml of a toluene solution and 0.07 g of succinic anhydride was added, followed by heating under nitrogen flow at 90° C. for 6 hours. After concentration using an evaporator until a polymer concentration became about 50%, the polymer solution was added to a large excess of a methanol solution and the precipitate was recovered. The thus obtained precipitate was dried in a vacuum dryer at 80° C. for 8 hours to obtain a polymer. The thus obtained polymer was dissolved in benzyl alcohol, followed by titration with a potassium hydroxide solution having a known concentration. As a result, it has been found that a carboxyl group concentration of a graft chain end is 1.12×10$^{-5}$ mol/g.

Reference Example 7

"SeRM"™ Super Polymer SH2400P (50 g) was dissolved in 500 ml of a toluene solution and 2.0 g of succinic anhydride was added, followed by heating under nitrogen flow at 90° C. for 6 hours. After concentration using an evaporator until a polymer concentration became about 50%, the polymer solution was added to a large excess of a methanol solution and the precipitate was recovered. The thus obtained precipitate was dried in a vacuum dryer at 80° C. for 8 hours to obtain a polymer. The thus obtained polymer was dissolved in benzyl alcohol, followed by titration with a potassium hydroxide solution having a known concentration. As a result, it has been found that a carboxyl group concentration of a graft chain end is 3.76×10$^{-4}$ mol/g.

Reference Example 8

α-cyclodextrin (1.0 g) and 4.0 g of an amino group-terminated polyethylene glycol having a number average molecular weight of 20,000 were dissolved in distilled water at 80° C. to obtain an aqueous solution. The thus obtained aqueous solution was left to stand overnight in a refrigerator, and then moisture was removed from the thus obtained cloudy solution by freeze drying to obtain a white solid. To the white solid, 0.7 ml of diisopropylethylamine, 0.85 g of adamantaneacetic acid, 0.6 g of 1-hydroxybenzotriazole, 1.8 g of benzotriazol-1-yloxytris(dimethylamino)phosphonium hexafluorophosphate, and 30 ml of dimethylformamide were added, and then the mixture was reacted under nitrogen purge at 5° C. for 24 hours. To the thus obtained reaction solution, 20 ml of methanol was added, and centrifugation was performed. To the thus obtained solid was further subjected to a washing/centrifugation operation twice with a mixed solvent (methanol:dimethylformamide=20 ml:20 ml) and a washing/centrifugation operation twice with 60 ml of methanol, and then vacuum-dried. The thus obtained solid was dissolved in 20 ml of dimethyl sulfoxide and the resultant solution was added dropwise in 200 ml of water to form a precipitate, which was centrifuged to remove a supernatant. Furthermore, the precipitate was subjected to a washing/centrifugation step once with 100 ml of water and a washing/centrifugation step once with 100 ml of methanol, and then vacuum-dried to obtain a polyrotaxane, both ends of which are blocked with an adamantane group. In this polyrotaxane, cyclodextrin as a cyclic molecule is not modified with a graft chain.

<Evaluation Methods>

A description will be made on evaluation methods in the respective Examples and Comparative Examples. Unless otherwise specified, the number of samples to be evaluated (n) was 5 and an average was determined.

(1) Amount of Reaction Product of Polyamide (A) and Polyrotaxane (B)

Pellets obtained in the respective Examples and Comparative Examples were crushed into pieces having a particle diameter of 100 μm or less using a crusher. Furthermore, Soxhlet extraction was performed for 24 hours using acetone as a solvent, and then the unreacted polyrotaxane component was extracted from the crushed material to thereby determine a content ratio (X) of the unreacted polyrotaxane in the resin composition. Furthermore, the extraction residue obtained after extraction was dissolved in hexafluoroisopropanol and the measurement was performed by gel permeation chromatography. The measurement was performed by gel permeation chromatography in which hexafluoroisopropanol is used as a solvent and Shodex HFIP-806M (two columns)+HFIP-LG are used as columns. From an area ratio of the thus obtained chart, calculation was made on a ratio (Y:Z) of a content ratio (Y) of the unreacted polyamide contained in the extraction residue and a content ratio (Z) of a reaction product of the polyamide (A) and the polyrotaxane (B). From the thus obtained value, a content ratio of a reaction product relative to 100 parts by weight of the polyamide (A) and the polyamide (B) was obtained by the following equation (2).

Content ratio (parts by weight) of reaction product=$100 \times (1-X) \times Z/(Y+Z)$  (2)

(2) Form of Phase-Separated Structure and Average Diameter of Island Phase

Pellets obtained in the respective Examples and Comparative Examples were vacuum-dried at 80° C. for 12 hours, and then injection-molded under the conditions of a cylinder temperature of 240° C. (180° C. in Comparative Example 9, or 190° C. in Comparative Example 10) and a mold temperature of 80° C. using an injection molding machine (SG75H-MIV, manufactured by Sumitomo Heavy Industries, Ltd.) to produce an ASTM #4 dumbbell test piece having a thickness of 3.2 mm. After partially cutting from this dumbbell test piece, a sample for observation of cross-section (about 2 mm×about 1 mm) was produced by a diamond knife using an ultramicrotome (EM UC7) manufactured by Leica Microsystems Ltd. The sample thus obtained was stained with phosphotungstic acid/osmium so that sufficient contrast was given to the morphology, and then the phase structure of the cross-section of a sample for observation was observed by a transmission electron microscope (H-7100, manufactured by Hitachi, Ltd.) at an acceleration voltage of 100 kV. The structure in which a sea phase including one component as a main component is studded with island phases including the other component as a main component was regarded as an islands-in-sea structure. The structure further having a particulate structure in an island phase of an islands-in-sea structure was regarded as a lakes-in-islands-in-sea structure.

With respect to a sample having the islands-in-sea structure formed therein, an average diameter of each island structure was determined by the following method. A magnification was adjusted so that 50 or more and less than 100 island structures existed in a square electromicroscopic photograph. At such a magnification, 50 island structures were selected at random from the island structures existing in observed images, and then a major axis and a minor axis were measured with respect to each island structure. An average of the major axis and the minor axis was regarded as a diameter of each island structure, and an average of the thus measured diameters of all island structures was regarded as an average diameter of the island structure.

(3) Toughness (Tensile Elongation at Break)

Pellets obtained in the respective Examples and Comparative Examples were vacuum-dried at 80° C. for 12 hours, and then injection-molded under the conditions of a cylinder temperature of 240° C. (180° C. in Comparative Example 9, or 190° C. in Comparative Example 10) and a mold temperature of 80° C. using an injection molding machine (SG75H-MIV, manufactured by Sumitomo Heavy Industries, Ltd.) to produce a multi-purpose type-A test piece obtained in accordance with ISO3167. With respect to a tensile test piece obtained from this multi-purpose test piece, a tensile test was performed at a crosshead speed of 100 mm/minute and 1,000 mm in conformity with ISO527 (2012), using a tension tester Tensilon UTA2.5T (manufactured by ORIENTEC Co., LTD.) and then a tensile elongation at break was measured.

(4) Rigidity (Bending Elastic Modulus)

Pellets obtained in the respective Examples and Comparative Examples were vacuum-dried at 80° C. for 12 hours, and then injection-molded under the conditions of a cylinder temperature of 240° C. (180° C. in Comparative Example 9, or 190° C. in Comparative Example 10) and a mold temperature of 80° C. using an injection molding machine (SG75H-MIV, manufactured by Sumitomo Heavy Industries, Ltd.) to produce a multi-purpose type-A test piece obtained in accordance with ISO3167. With respect to a bending test piece obtained from this multi-purpose test piece, a bending test was performed at a crosshead speed of 2 mm/minute in conformity with ISO178 (2001), using a tension tester Tensilon RTA-1T (manufactured by ORIENTEC Co., LTD.) and then a bending elastic modulus was measured.

Examples 1 to 21, Comparative Examples 1 to 5 and 8

A polyamide resin and polyrotaxane, polyethylene glycol or a glycidyl methacrylate-modified polyethylene copolymer were mixed so as to obtain the composition shown in Tables 1 to 3. After preblending, the preblended mixture was supplied to a twin-screw extruder (Model PCM-30, manufactured by IKEGAI Iron Works, Ltd.) set at a cylinder temperature of 240° C. and a screw speed of 200 rpm, and then melt-kneaded. The gut ejected from the extruder was pelletized to obtain pellets. The thus obtained pellets were evaluated by the above methods. The results are shown in Tables 1 to 3.

Comparative Example 6

A maleic anhydride-modified polypropylene and a polyrotaxane were mixed so as to obtain the composition shown in Table 3. After preblending, the preblended mixture was supplied to a twin-screw extruder (Model PCM-30, manufactured by IKEGAI Iron Works, Ltd.) set at a cylinder temperature of 180° C. and a screw speed of 200 rpm, and then melt-kneaded. The gut ejected from the extruder was pelletized to obtain pellets. The thus obtained pellets were evaluated by the above methods. The results are shown in Table 3.

Comparative Example 7

A polylactic acid and a polyrotaxane were mixed so as to obtain the composition shown in Table 3. After preblending, the preblended mixture was supplied to a twin-screw extruder (Model PCM-30, manufactured by IKEGAI Iron Works, Ltd.) set at a cylinder temperature of 190° C. and a screw speed of 200 rpm, and then melt-kneaded. The gut ejected from the extruder was pelletized to obtain pellets. The thus obtained pellets were evaluated by the above methods. The results are shown in Table 3.

TABLE 1

|  |  |  |  | Example 1 | Example 2 | Example 3 | Example 4 | Example 5 |
|---|---|---|---|---|---|---|---|---|
| Polyamide | A-1 | Nylon 6 ($\eta_r$ = 2.70) | parts by weight | 99 | 95 | 90 | 85 | 99 |
|  | A-2 | Nylon 6 (Reference Example 1) | parts by weight | — | — | — | — | — |
| Carboxylic acid-modified polyrotaxane | B-1 | (Reference Example 2) | parts by weight | 1 | 5 | 10 | 15 | — |
|  | B-2 | (Reference Example 3) | parts by weight | — | — | — | — | — |
|  | B-3 | (Reference Example 4) | parts by weight | — | — | — | — | — |
|  | B-4 | (Reference Example 5) | parts by weight | — | — | — | — | — |
|  | B-5 | (Reference Example 6) | parts by weight | — | — | — | — | — |
|  | B-6 | (Reference Example 7) | parts by weight | — | — | — | — | — |
| Polyrotaxane | B-7 | SH3400P | parts by weight | — | — | — | — | 1 |
|  | B-8 | (Reference Example 8) | parts by weight | — | — | — | — | — |
| Polyethylene glycol | C-1 | PEG | parts by weight | — | — | — | — | — |
| Glycidyl methacrylate-modified polyethylene copolymer | C-2 | EGMA | parts by weight | — | — | — | — | — |
| Maleic anhydride-modified polypropylene | D-1 | P613 | parts by weight | — | — | — | — | — |
| Polylactic acid | D-2 | 4032D | parts by weight | — | — | — | — | — |
| Reaction product of polyamide (A) and polyrotaxane (B) |  |  | parts by weight | 2 | 10 | 12 | 16 | 0 |
| Types of functional group of polyrotaxane |  |  | — | Carboxyl group | Carboxyl group | Carboxyl group | Carboxyl group | None |
| Functional group concentration of polyrotaxane |  |  | mol/g | $2.53 \times 10^{-4}$ | $2.53 \times 10^{-4}$ | $2.53 \times 10^{-4}$ | $2.53 \times 10^{-4}$ | — |
| Form of phase-separated structure |  |  | — | Lakes-in-islands-in-sea structure | Lakes-in-islands-in-sea structure | Lakes-in-islands-in-sea structure | Lakes-in-islands-in-sea structure | Islands-in-sea structure |
| Average diameter of island phase |  |  | μm | 0.42 | 0.44 | 0.77 | 0.85 | 0.56 |
| Toughness | Tensile elongation at break at 100 mm/min |  | % | 13.1 | 13.7 | 24.2 | 42.2 | 11.8 |
|  | Tensile elongation at break at 1,000 mm/min |  | % | 12.1 | 11.9 | 19.2 | 34.5 | 10.3 |
| Rigidity | Bending elastic modulus |  | GPa | 2.9 | 2.93 | 2.63 | 2.42 | 2.78 |

|  |  |  |  | Example 6 | Example 7 | Example 8 | Comparative Example 1 |
|---|---|---|---|---|---|---|---|
| Polyamide | A-1 | Nylon 6 ($\eta_r$ = 2.70) | parts by weight | 95 | 90 | 85 | 100 |
|  | A-2 | Nylon 6 (Reference Example 1) | parts by weight | — | — | — | — |
| Carboxylic acid-modified polyrotaxane | B-1 | (Reference Example 2) | parts by weight | — | — | — | — |
|  | B-2 | (Reference Example 3) | parts by weight | — | — | — | — |
|  | B-3 | (Reference Example 4) | parts by weight | — | — | — | — |
|  | B-4 | (Reference Example 5) | parts by weight | — | — | — | — |
|  | B-5 | (Reference Example 6) | parts by weight | — | — | — | — |
|  | B-6 | (Reference Example 7) | parts by weight | — | — | — | — |
| Polyrotaxane | B-7 | SH3400P | parts by weight | 5 | 10 | 15 | — |
|  | B-8 | (Reference Example 8) | parts by weight | — | — | — | — |
| Polyethylene glycol | C-1 | PEG | parts by weight | — | — | — | — |
| Glycidyl methacrylate-modified polyethylene copolymer | C-2 | EGMA | parts by weight | — | — | — | — |
| Maleic anhydride-modified polypropylene | D-1 | P613 | parts by weight | — | — | — | — |

TABLE 1-continued

| | | | | | | | |
|---|---|---|---|---|---|---|---|
| Polylactic acid | D-2 | 4032D | parts by weight | — | — | — | — |
| Reaction product of polyamide (A) and polyrotaxane (B) | | | parts by weight | 0 | 0 | 0 | — |
| Types of functional group of polyrotaxane | | | — | None | None | None | — |
| Functional group concentration of polyrotaxane | | | mol/g | — | — | — | — |
| Form of phase-separated structure | | | — | Islands-in-sea structure | Islands-in-sea structure | Islands-in-sea structure | — |
| Average diameter of island phase | | | μm | 0.64 | 0.97 | 1.23 | — |
| Toughness | Tensile elongation at break at 100 mm/min | | % | 12.2 | 19.6 | 28.3 | 12.9 |
| | Tensile elongation at break at 1,000 mm/min | | % | 11.7 | 13.4 | 21.4 | 5.2 |
| Rigidity | Bending elastic modulus | | GPa | 2.85 | 2.72 | 2.34 | 2.83 |

TABLE 2

| | | | | Comparative Example 2 | Comparative Example 3 | Comparative Example 4 | Example 9 | Example 10 |
|---|---|---|---|---|---|---|---|---|
| Polyamide | A-1 | Nylon 6 ($\eta_r$ = 2.70) | parts by weight | 95 | 95 | 95 | 95 | 90 |
| | A-2 | Nylon 6 (Reference Example 1) | parts by weight | — | — | — | — | — |
| Carboxylic acid-modified polyrotaxane | B-1 | (Reference Example 2) | parts by weight | — | — | — | — | — |
| | B-2 | (Reference Example 3) | parts by weight | — | — | — | 5 | 10 |
| | B-3 | (Reference Example 4) | parts by weight | — | — | — | — | — |
| | B-4 | (Reference Example 5) | parts by weight | — | — | — | — | — |
| | B-5 | (Reference Example 6) | parts by weight | — | — | — | — | — |
| | B-6 | (Reference Example 7) | parts by weight | — | — | — | — | — |
| Polyrotaxane | B-7 | SH3400P | parts by weight | — | — | — | — | — |
| | B-8 | (Reference Example 8) | parts by weight | 5 | — | — | — | — |
| Polyethylene glycol | C-1 | PEG | parts by weight | — | 5 | — | — | — |
| Glycidyl methacrylate-modified polyethylene copolymer | C-2 | EGMA | parts by weight | — | — | 5 | — | — |
| Maleic anhydride-modified polypropylene | D-1 | P613 | parts by weight | — | — | — | — | — |
| Polylactic acid | D-2 | 4032D | parts by weight | — | — | — | — | — |
| Reaction product of polyamide (A) and polyrotaxane (B) | | | parts by weight | 0 | 0 | 0 | 12 | 13 |
| Types of functional group of polyrotaxane | | | — | — | — | — | Carboxyl group | Carboxyl group |
| Functional group concentration of polyrotaxane | | | mol/g | — | — | — | 2.46 × 10$^{-4}$ | 2.46 × 10$^{-4}$ |
| Form of phase-separated structure | | | — | Islands-in-sea structure | Islands-in-sea structure | Islands-in-sea structure | Lakes-in-islands-in-sea structure | Lakes-in-islands-in-sea structure |
| Average diameter of island phase | | | μm | 2.55 | 1.58 | 2.34 | 0.42 | 0.67 |
| Toughness | Tensile elongation at break at 100 mm/min | | % | 4.5 | 9.9 | 13.4 | 15.3 | 28.3 |
| | Tensile elongation at break at 1,000 mm/min | | % | 4.2 | 7.3 | 8.9 | 13.5 | 24.5 |
| Rigidity | Bending elastic modulus | | GPa | 2.78 | 2.65 | 2.55 | 2.91 | 2.64 |

TABLE 2-continued

|  |  |  |  | Example 11 | Example 12 | Example 13 | Example 14 | Example 15 |
|---|---|---|---|---|---|---|---|---|
| Polyamide | A-1 | Nylon 6 ($\eta_r$ = 2.70) | parts by weight | 85 | 95 | 90 | 85 | 95 |
|  | A-2 | Nylon 6 (Reference Example 1) | parts by weight | — | — | — | — | — |
| Carboxylic acid-modified polyrotaxane | B-1 | (Reference Example 2) | parts by weight | — | — | — | — | — |
|  | B-2 | (Reference Example 3) | parts by weight | 15 | — | — | — | — |
|  | B-3 | (Reference Example 4) | parts by weight | — | 5 | 10 | 15 | — |
|  | B-4 | (Reference Example 5) | parts by weight | — | — | — | — | 5 |
|  | B-5 | (Reference Example 6) | parts by weight | — | — | — | — | — |
|  | B-6 | (Reference Example 7) | parts by weight | — | — | — | — | — |
| Polyrotaxane | B-7 | SH3400P | parts by weight | — | — | — | — | — |
|  | B-8 | (Reference Example 8) | parts by weight | — | — | — | — | — |
| Polyethylene glycol | C-1 | PEG | parts by weight | — | — | — | — | — |
| Glycidyl methacrylate-modified polyethylene copolymer | C-2 | EGMA | parts by weight | — | — | — | — | — |
| Maleic anhydride-modified polypropylene | D-1 | P613 | parts by weight | — | — | — | — | — |
| Polylactic acid | D-2 | 4032D | parts by weight | — | — | — | — | — |
| Reaction product of polyamide (A) and polyrotaxane (B) |  |  | parts by weight | 16 | 14 | 15 | 18 | 19 |
| Types of functional group of polyrotaxane |  |  | — | Carboxyl group | Carboxyl group | Carboxyl group | Carboxyl group | Carboxyl group |
| Functional group concentration of polyrotaxane |  |  | mol/g | $2.46 \times 10^{-4}$ | $2.51 \times 10^{-4}$ | $2.51 \times 10^{-4}$ | $2.51 \times 10^{-4}$ | $5.05 \times 10^{-5}$ |
| Form of phase-separated structure |  |  | — | Lakes-in-islands-in-sea structure | Lakes-in-islands-in-sea structure | Lakes-in-islands-in-sea structure | Lakes-in-islands-in-sea structure | Lakes-in-islands-in-sea structure |
| Average diameter of island phase |  |  | μm | 0.74 | 0.34 | 0.55 | 0.78 | 0.36 |
| Toughness | Tensile elongation at break at 100 mm/min |  | % | 43.2 | 17.7 | 30.5 | 45.4 | 18.5 |
|  | Tensile elongation at break at 1,000 mm/min |  | % | 36.9 | 15.7 | 26.2 | 37.5 | 16.3 |
| Rigidity | Bending elastic modulus |  | GPa | 2.39 | 2.89 | 2.61 | 2.44 | 2.91 |

TABLE 3

|  |  |  |  | Example 16 | Example 17 | Example 18 | Example 19 | Example 20 |
|---|---|---|---|---|---|---|---|---|
| Polyamide | A-1 | Nylon 6 ($\eta_r$ = 2.70) | parts by weight | 95 | 85 | 99 | 95 | — |
|  | A-2 | Nylon 6 (Reference Example 1) | parts by weight | — | — | — | — | 95 |
| Carboxylic acid-modified polyrotaxane | B-1 | (Reference Example 2) | parts by weight | — | — | — | — | — |
|  | B-2 | (Reference Example 3) | parts by weight | — | — | — | — | 5 |
|  | B-3 | (Reference Example 4) | parts by weight | — | — | — | — | — |
|  | B-4 | (Reference Example 5) | parts by weight | — | — | — | — | — |
|  | B-5 | (Reference Example 6) | parts by weight | 5 | 15 | — | — | — |

TABLE 3-continued

|  |  |  |  |  |  |  |  |  |
|---|---|---|---|---|---|---|---|---|
|  | B-6 | (Reference Example 7) | parts by weight | — | — | 1 | 5 | — |
| Polyrotaxane | B-7 | SH3400P | parts by weight | — | — | — | — | — |
|  | B-8 | (Reference Example 8) | parts by weight | — | — | — | — | — |
| Polyethylene glycol | C-1 | PEG | parts by weight | — | — | — | — | — |
| Glycidyl methacrylate-modified polyethylene copolymer | C-2 | EGMA | parts by weight | — | — | — | — | — |
| Maleic anhydride-modified polypropylene | D-1 | P613 | parts by weight | — | — | — | — | — |
| Polylactic acid | D-2 | 4032D | parts by weight | — | — | — | — | — |
| Reaction product of polyamide (A) and polyrotaxane (B) |  |  | parts by weight | 2 | 8 | 12 | 28 | 11 |
| Types of functional group of polyrotaxane |  |  | — | Carboxyl group | Carboxyl group | Carboxyl group | Carboxyl group | Carboxyl group |
| Functional group concentration of polyrotaxane |  |  | mol/g | $1.12 \times 10^{-5}$ | $1.12 \times 10^{-5}$ | $3.76 \times 10^{-4}$ | $3.76 \times 10^{-4}$ | $2.46 \times 10^{-4}$ |
| Form of phase-separated structure |  |  | — | Lakes-in-islands-in-sea structure | Lakes-in-islands-in-sea structure | Lakes-in-islands-in-sea structure | Lakes-in-islands-in-sea structure | Lakes-in-islands-in-sea structure |
| Average diameter of island phase |  |  | μm | 1.5 | 1.9 | 0.36 | 0.38 | 0.29 |
| Toughness | Tensile elongation at break at 100 mm/min |  | % | 15.4 | 32.8 | 12.8 | 13.1 | 19.3 |
|  | Tensile elongation at break at 1,000 mm/min |  | % | 14.3 | 25.8 | 11.8 | 11 | 17.1 |
| Rigidity | Bending elastic modulus |  | GPa | 2.74 | 2.37 | 2.92 | 2.9 | 2.85 |

|  |  |  |  | Example 21 | Comparative Example 5 | Comparative Example 6 | Comparative Example 7 | Comparative Example 8 |
|---|---|---|---|---|---|---|---|---|
| Polyamide | A-1 | Nylon 6 ($\eta_r = 2.70$) | parts by weight | — | — | — | — | — |
|  | A-2 | Nylon 6 (Reference Example 1) | parts by weight | 95 | 100 | — | — | 75 |
| Carboxylic acid-modified polyrotaxane | B-1 | (Reference Example 2) | parts by weight | — | — | — | — | 25 |
|  | B-2 | (Reference Example 3) | parts by weight | — | — | — | 5 | — |
|  | B-3 | (Reference Example 4) | parts by weight | — | — | — | — | — |
|  | B-4 | (Reference Example 5) | parts by weight | 5 | — | — | — | — |
|  | B-5 | (Reference Example 6) | parts by weight | — | — | — | — | — |
|  | B-6 | (Reference Example 7) | parts by weight | — | — | — | — | — |
| Polyrotaxane | B-7 | SH3400P | parts by weight | — | — | 5 | — | — |
|  | B-8 | (Reference Example 8) | parts by weight | — | — | — | — | — |
| Polyethylene glycol | C-1 | PEG | parts by weight | — | — | — | — | — |
| Glycidyl methacrylate-modified polyethylene copolymer | C-2 | EGMA | parts by weight | — | — | — | — | — |
| Maleic anhydride-modified polypropylene | D-1 | P613 | parts by weight | — | — | 95 | — | — |
| Polylactic acid | D-2 | 4032D | parts by weight | — | — | — | 95 | — |
| Reaction product of polyamide (A) and polyrotaxane (B) |  |  | parts by weight | 8 | — | — | 15 | 28 |
| Types of functional group of polyrotaxane |  |  | — | Carboxyl group | — | None | Carboxyl group | Carboxyl group |
| Functional group concentration of polyrotaxane |  |  | mol/g | $5.05 \times 10^{-5}$ | — | — | $2.46 \times 10^{-4}$ | $2.53 \times 10^{-4}$ |

TABLE 3-continued

| | | | | Lakes-in-islands-in-sea structure | — | Islands-in-sea structure | Islands-in-sea structure | Lakes-in-islands-in-sea structure |
|---|---|---|---|---|---|---|---|---|
| Form of phase-separated structure | | — | | | | | | |
| Average diameter of island phase | | μm | 0.22 | — | 2.1 | 1.3 | 11.63 | |
| Toughness | Tensile elongation at break at 100 mm/min | % | 21.9 | 14.2 | 110.2 | 7.9 | 76.1 | |
| | Tensile elongation at break at 1,000 mm/min | % | 19.4 | 9.8 | 59.3 | 4.2 | 55.3 | |
| Rigidity | Bending elastic modulus | GPa | 2.91 | 2.89 | 1.1 | 3.5 | 1.87 | |

As is apparent from a comparison between Examples 1 to 21 and Comparative Examples 1 to 5 and 8, when mixing a polyrotaxane whose cyclic molecule is modified with a graft chain, balance between toughness and rigidity is excellent as compared with the case of mixing no polyrotaxane, or the case of mixing a polyrotaxane whose cyclic molecule is not modified with a graft chain. Furthermore, as is apparent from a comparison between Examples 1 to 4 and Examples 5 to 8, when a polyamide is mixed with a specific amount of a polyrotaxane whose graft chain end is modified with carboxylic acid, both toughness and rigidity are excellent as compared with the case of mixing a non-modified polyrotaxane.

Whereas, it is apparent that when mixing a polyrotaxane whose cyclic molecule is not modified with a graft chain, or PEG, toughness deteriorates, whereas, when mixing EGMA, rigidity deteriorates, although toughness is improved. It is apparent that when mixing a maleic anhydride-modified polypropylene or a polylactic acid in place of the polyamide, rigidity or toughness deteriorates. A lakes-in-islands-in-sea structure was formed in Examples 1 to 4, whereas, no lake structure could be observed and an islands-in-sea structure was formed in Examples 5 to 8 and Comparative Examples 6 and 7.

As is apparent from Examples 9 to 14, the same effect is obtained regardless of a linear molecular weight and an entire molecular weight of a polyrotaxane.

As is apparent from Examples 2, 9, 12, 15, 16, and 19, when mixing a polyrotaxane in which a concentration of functional group at the end of the graft chain is $2\times10^{-5}$ mol/g or more and $5\times10^{-4}$ mol/g or less, and more preferably $3\times10^{-5}$ mol/g or more and $1\times10^{-4}$ mol/g or less, balance between rigidity and toughness is further improved.

The invention claimed is:

1. A resin composition comprising a mixture of: (A) a polyamide and (B) a polyrotaxane, wherein the cyclic molecule of the polyrotaxane is modified with a graft chain, and wherein 80 parts by weight or more and 99.9 parts by weight or less of the polyamide (A) and 0.1 part by weight or more and 20 parts by weight or less of the polyrotaxane (B) are mixed together relative to 100 parts by weight of the total amount of the polyamide (A) and the polyrotaxane (B), and the resin composition has an islands-in-sea structure composed of a sea phase including the polyamide (A) as a main component and an island phase including the polyrotaxane (B) as a main component, as well as a lakes-in-islands-in-sea structure with a lake phase including the polyamide (A) and/or a reaction product of the polyamide (A) and the polyrotaxane (B) as main component(s), the lake phase being disposed in the island phase.

2. The resin composition according to claim 1, wherein the graft chain is a graft chain having at least one functional group selected from the group consisting of a carboxyl group, an isocyanate group, a glycidyl group, and an amino group at the end of the graft chain.

3. The resin composition according to claim 2, wherein a concentration of functional group at the end of the graft chain of the polyrotaxane (B) is $2\times10^{-5}$ mol/g or more and $5\times10^{-4}$ mol/g or less.

4. The resin composition according to claim 1, which contains 3 parts by weight or more and 25 parts by weight or less of a reaction product of the polyamide (A) and the polyrotaxane (B) relative to 100 parts by weight of the total amount of the polyamide (A) and the polyrotaxane (B).

5. The resin composition according to claim 1, wherein the island phase has an average diameter of 10 μm or less.

6. A molded article comprising the resin composition according to claim 1.

* * * * *